US008620494B2

(12) United States Patent
Coombs

(10) Patent No.: US 8,620,494 B2
(45) Date of Patent: Dec. 31, 2013

(54) VEHICLE INTERFACE BASED ON THE WEIGHT DISTRIBUTION OF A USER

(76) Inventor: Joshua D. Coombs, Haslet, MI (US)

(*) Notice: Subject to any disclaimer, the term of this patent is extended or adjusted under 35 U.S.C. 154(b) by 0 days.

(21) Appl. No.: 13/341,037

(22) Filed: Dec. 30, 2011

(65) Prior Publication Data

US 2012/0101665 A1 Apr. 26, 2012

Related U.S. Application Data

(63) Continuation of application No. 11/239,805, filed on Sep. 30, 2005, now Pat. No. 8,099,200.

(51) Int. Cl.
*G05D 1/08* (2006.01)
*B60G 17/016* (2006.01)
*B60G 17/018* (2006.01)

(52) U.S. Cl.
USPC ................................. 701/4; 701/37

(58) Field of Classification Search
USPC ............................................. 701/4
See application file for complete search history.

(56) References Cited

U.S. PATENT DOCUMENTS

| | | | |
|---|---|---|---|
| 2,834,606 A | 10/1955 | Bertrand | |
| 2,781,182 A * | 2/1957 | Ross | 244/232 |
| 3,210,027 A * | 10/1965 | Culver et al. | 244/17.23 |
| 3,451,501 A | 6/1969 | Applegate | |
| 3,506,221 A * | 4/1970 | Vidal et al. | 244/23 R |
| 3,528,633 A * | 9/1970 | Knemeyer | 244/179 |
| 3,771,359 A | 11/1973 | Shoberg | |
| 3,898,823 A * | 8/1975 | Ludeman | 70/200 |
| 3,912,260 A | 10/1975 | Rice | |
| 4,496,579 A | 1/1985 | Crame et al. | |
| 4,632,408 A | 12/1986 | Olpp et al. | |
| 4,706,072 A | 11/1987 | Ikeyama | |
| 4,869,496 A | 9/1989 | Colombo | |
| 4,906,192 A | 3/1990 | Smithard et al. | |
| 5,195,746 A * | 3/1993 | Boyd et al. | 463/37 |
| 5,252,068 A * | 10/1993 | Gryder | 434/30 |
| 5,301,900 A * | 4/1994 | Groen et al. | 244/17.25 |
| 5,489,830 A | 2/1996 | Fernandez | |
| 5,547,382 A | 8/1996 | Yamasaki et al. | |
| 5,713,794 A * | 2/1998 | Shimojima et al. | 463/36 |
| 5,792,031 A * | 8/1998 | Alton | 482/78 |
| 5,835,008 A | 11/1998 | Colemere, Jr. | |

(Continued)

FOREIGN PATENT DOCUMENTS

| | | |
|---|---|---|
| DE | 10309621 A | 9/2004 |
| EP | 0081630 A | 6/1983 |
| EP | 0275665 A | 7/1988 |
| WO | 2007041401 A | 4/2007 |

OTHER PUBLICATIONS

Australian Patent Application No. 2006299648, Examiner's Report mailed Jan. 18, 2011.

(Continued)

*Primary Examiner* — Shelley Chen
(74) *Attorney, Agent, or Firm* — Jeffrey Schox

(57) ABSTRACT

In one embodiment, the invention is an interface for communicating a vehicle command from a user to a vehicle. The interface preferably includes a support system to support at least a portion of the weight of a user, a sensor system to sense the weight distribution of the user, and a processor to interpret a vehicle command based on the weight distribution of the user and to communicate the vehicle command to a vehicle.

22 Claims, 8 Drawing Sheets

(56) References Cited

U.S. PATENT DOCUMENTS

| | | | |
|---|---|---|---|
| 5,874,892 A | 2/1999 | Antonellis et al. | |
| 5,971,091 A | 10/1999 | Kamen et al. | |
| 6,014,940 A * | 1/2000 | Jacobson | 114/271 |
| 6,032,299 A | 3/2000 | Welsh | |
| 6,060,989 A | 5/2000 | Gehlot | |
| 6,225,977 B1 | 5/2001 | Li | |
| 6,288,505 B1 | 9/2001 | Heinzmann et al. | |
| 6,293,361 B1 | 9/2001 | Mueller | |
| 6,356,190 B1 | 3/2002 | Albrecht | |
| 6,392,550 B1 | 5/2002 | Najor | |
| 6,445,303 B1 | 9/2002 | Aryeh | |
| 6,471,584 B1 | 10/2002 | Wada et al. | |
| 6,471,586 B1 | 10/2002 | Aiki et al. | |
| 6,595,537 B2 * | 7/2003 | Miyoshi | 280/283 |
| 6,849,032 B2 | 2/2005 | Chu | |
| 6,880,855 B2 | 4/2005 | Chernoff et al. | |
| 6,913,107 B2 | 7/2005 | Sato et al. | |
| 7,004,271 B1 | 2/2006 | Kamen et al. | |
| 7,095,317 B2 | 8/2006 | Albrecht | |
| 7,125,074 B2 | 10/2006 | Real et al. | |
| 7,174,976 B2 | 2/2007 | Kamen et al. | |
| 7,275,607 B2 | 10/2007 | Kamen et al. | |
| 2002/0145512 A1 | 10/2002 | Sleichter et al. | |
| 2004/0130463 A1 | 7/2004 | Bloomquist et al. | |
| 2004/0263326 A1 | 12/2004 | Albrecht | |
| 2005/0065688 A1 | 3/2005 | Rao et al. | |
| 2006/0260862 A1 | 11/2006 | Nishikawa | |
| 2007/0074921 A1 * | 4/2007 | Coombs | 180/315 |
| 2007/0074922 A1 | 4/2007 | Coombs et al. | |
| 2007/0078569 A1 | 4/2007 | Schox et al. | |
| 2007/0078577 A1 * | 4/2007 | Coombs | 701/36 |
| 2009/0076686 A1 | 3/2009 | Schox et al. | |
| 2012/0101665 A1 | 4/2012 | Coombs | |

OTHER PUBLICATIONS

British Patent Application No. GB0807706.7, Examination Report mailed Oct. 8, 2009.

International Patent Application No. PCT/US06/38255, International Search Report and Written Opinion mailed Feb. 27, 2008.

* cited by examiner

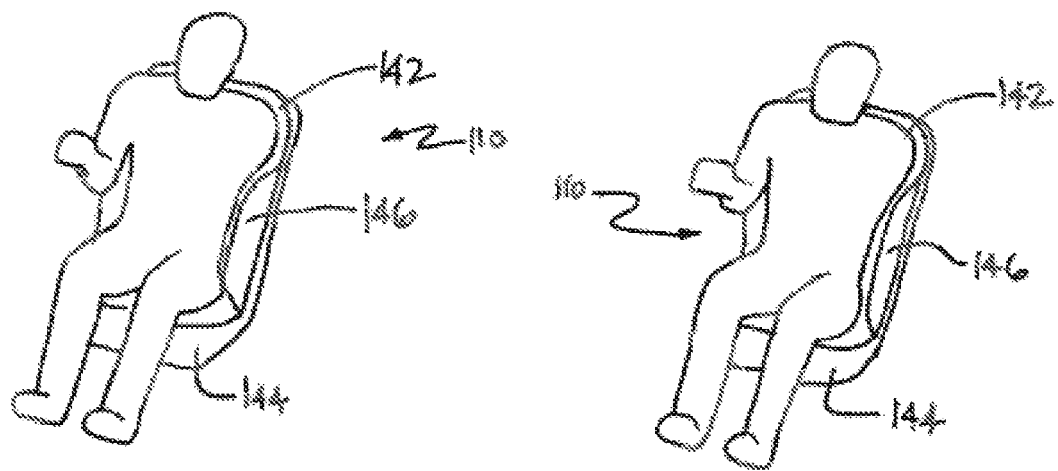

VEHICLE INTERFACE BASED ON THE WEIGHT DISTRIBUTION OF A USER

CROSS-REFERENCE TO RELATED APPLICATIONS

This application is a continuation of U.S. patent application Ser. No. 11/239,805, filed 30 Sep. 2005 and entitled "Vehicle Interface Based On The Weight Distribution Of A User," which is incorporated in its entirety by this reference.

This application is further related to and incorporates by reference: U.S. patent application Ser. No. 11/239,804, filed 30 Sep. 2005 and entitled "Vehicle Interface Based On A Shift Of The Torso Of A User;" U.S. patent application Ser. No. 11/239,803, filed 30 Sep. 2005 and entitled "Vehicle Interface Based On A Shift Of The Appendages Of A User;" and U.S. patent application Ser. No. 11/239,963, filed 30 Sep. 2005 and entitled "Vehicle Interface To Communicate A Safety Alert Mode Command."

BRIEF DESCRIPTION OF THE FIGURES

FIG. 11 includes isometric views of the second variation of the engagement system, showing the seat bolsters in an "engaged" mode and a "relaxed" mode.

DESCRIPTION OF THE PREFERRED EMBODIMENTS

Figure 1A:
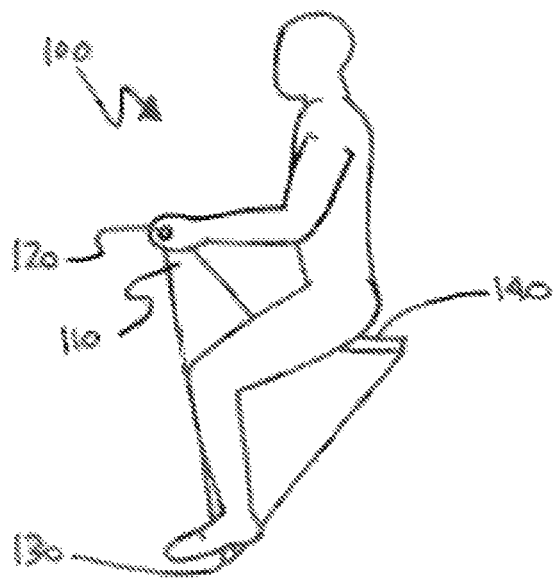
FIGS. 1-3 include side and front views of the first preferred embodiment.
Figure 1B:
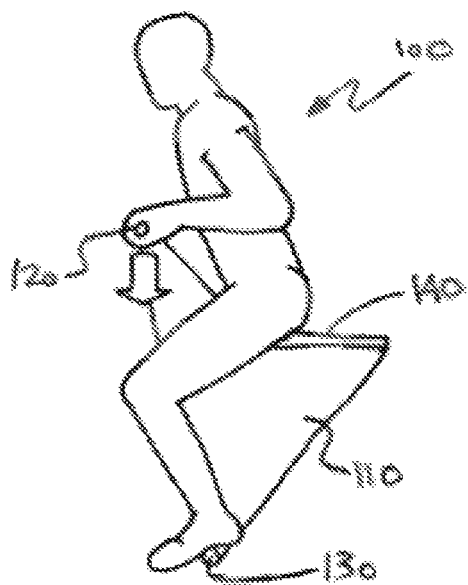
Figure 1C:
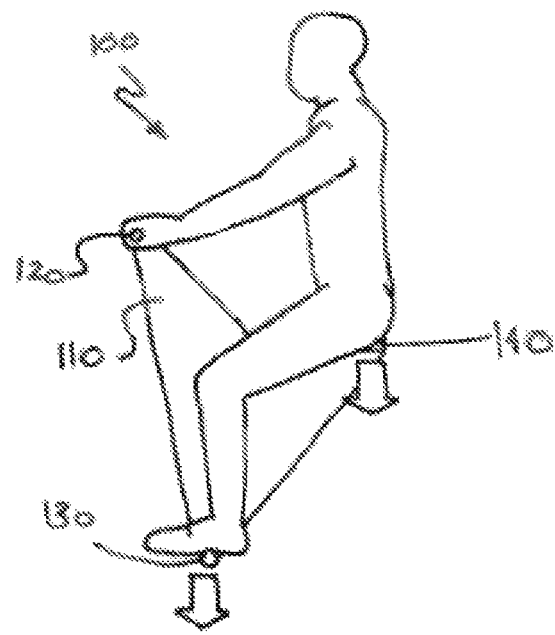

The following description of four preferred embodiments of the invention is not intended to limit the invention to these preferred embodiments, but rather to enable any person skilled in the art to make and use this invention.

As shown in the FIGS. 1-10, the interface 100 of the preferred embodiments includes an engagement system 110, a sensor system coupled to the engagement system 110, and a processor 150 adapted to interpret a vehicle command based on an output from the sensor system and to communicate the vehicle command to a vehicle. While most of the commands are known in the art, the invention teaches a more intuitive interface to sense and interpret these commands. The invention, therefore, provides an interface 100 that senses and interprets new commands (such as a vehicle roll or pitch command in an automobile) that the user would not have been able to quickly activate with conventional interfaces, or more commands (such as a vehicle configuration command in an aircraft) that the user would not have been able to easily navigate with conventional interfaces. With this interface 100, the vehicle may be able to react better or faster to upcoming situations (such as a bump, a turn, or a climb), since the user may be able to communicate better or faster information to the vehicle. With this interface 100, the vehicle may also be able to perform better and/or the user may be able to perform with less mental or physical strain. The vehicle, it is hoped, will become a more natural (or intuitive) extension of the user with the incorporation of this invention.

The interface 100 of the preferred embodiments is preferably integrated into a vehicle. The vehicle is preferably a wheeled vehicle (such a two-wheeled bicycle or motorcycle, a three-wheeled cycle, a four-wheeled automobile, truck, or all-terrain vehicle, or a multi-wheeled tractor), a watercraft (such as a jet ski, a motorboat, or a submarine), an aircraft (such as a small plane, a helicopter, or a hovercraft), a tracked vehicle (such as a snowmobile or a tank), or a railed vehicle (such as a train). The vehicle may, however, be any suitable vehicle that transports people or cargo with either human power, fuel power, or any other suitable power source. Although the interface 100 is preferably integrated into a vehicle, the interface 100 may alternatively be remotely coupled to a vehicle or may alternatively be integrated into a virtual vehicle environment. Alternatively, the interface 100 may be integrated into any suitable environment.

The command communicated by the interface 100 of the preferred embodiment is preferably a vehicle command. The vehicle command is preferably an attitude command (such as a vehicle pitch or a vehicle roll), a handling command (such as a suspension command or a height command), a configuration command (such as a track command, a wheelbase command, a hull shape command, or a wing shape command), a mode command (such as a "safety alert mode" command), or a combination command (such as a "bunny hop" command). The command communicated by the interface 100 may, however, be any suitable command. Although the command is preferably communicated to a vehicle, the command may be communicated to any suitable device or system.

1. The Engagement System of the Preferred Embodiments

Figure 2A:
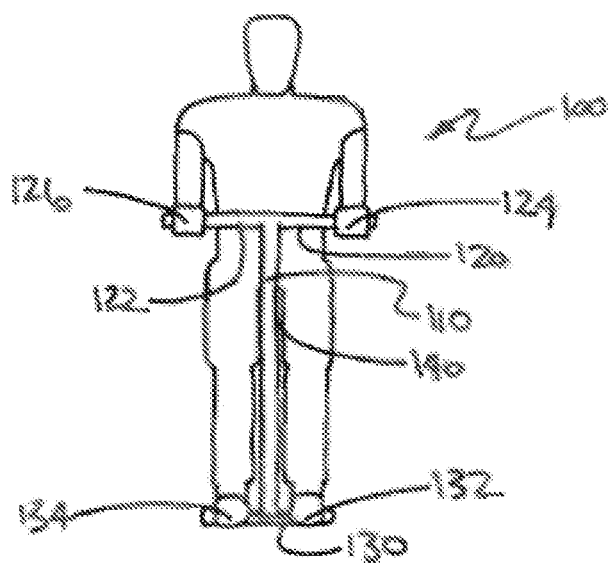
Figure 2B:
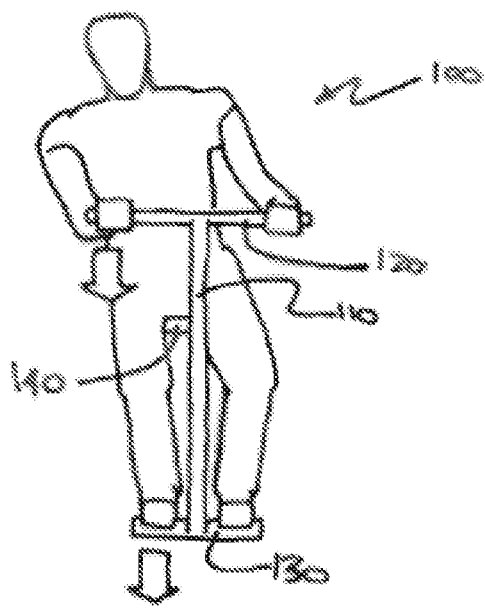

The engagement system 110 of the preferred embodiments functions to engage or support the user in the vehicle. In a first variation, as shown in FIGS. 1-3, the engagement system 110 supports at least a portion of the weight of the user, engages at least two appendages of the user, and includes: at least two of the following: a handbase 120, a footbase 130, and a seat 140. As best shown in FIG. 2A, the handbase 120 preferably includes a handlebar 122 with a left handgrip 124 engageable by the left hand of the user and a right handgrip 126 engageable by the right hand of the user. The footbase 130 preferably includes a left footrest 132 engageable by the left foot of the user and a right footrest 134 engageable by the right foot of the user. The handbase 120 and footbase 130 may alternatively include any suitable device or system to engage the hands and feet of the user. As best shown in FIG. 1A, the seat 140 preferably includes a straddle-type seat 140 (most commonly found on cycles and all-terrain vehicles) engageable by the lower torso of the user, but may alternatively include any suitable device to engage the lower torso of the user.

In a second variation, as shown in FIGS. 4-6 and 11, the engagement system 110 engages the torso of the user and includes at least two of the following: a seat back 142, a seat bottom 144, and side bolsters 146 and 148. The seat back 142 and the seat bottom 144 are preferably conventional seating elements, but may alternatively be any suitable system that engages the torso of the user, including a platform that supports the user in a prone position. The side bolsters 146 and 148 preferably include a left side bolster 146 engageable with the left side of the torso of the user and a right side bolster 148 engageable with a right side of the torso of the user. Preferably, the side bolsters 146 and 148 have an "engaged" position (FIG. 11A) in which the bolsters engage the torso of the user and a "relaxed" mode (FIG. 11B) in which the bolsters do not engage the torso user. The "engaged" and "relaxed" modes of the side bolsters 146 and 148 may be selected by the user by any suitable method (such as a finger-activated switch mounted on an instrument panel or a steering wheel, or a voice-activated switch), or may be selected by the vehicle upon the achievement of particular conditions.

Figure 7A:
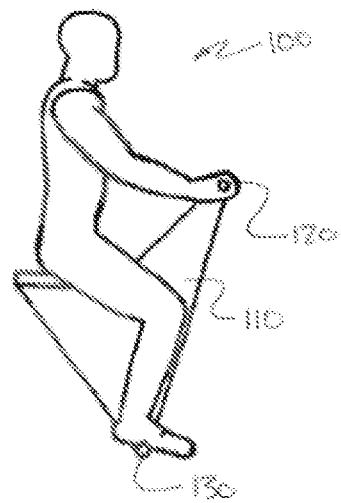
FIGS. 7-9 include side and front views of the third preferred embodiment.
Figure 7B:
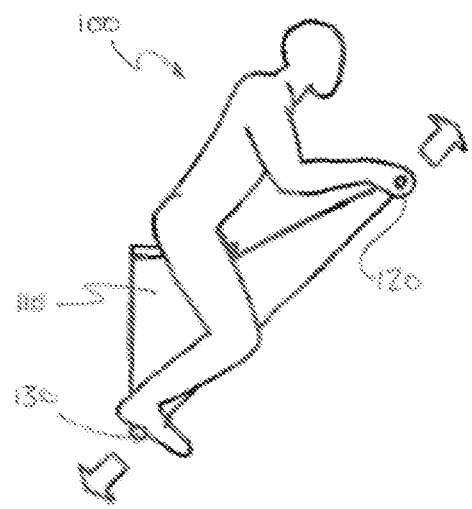
Figure 8A:
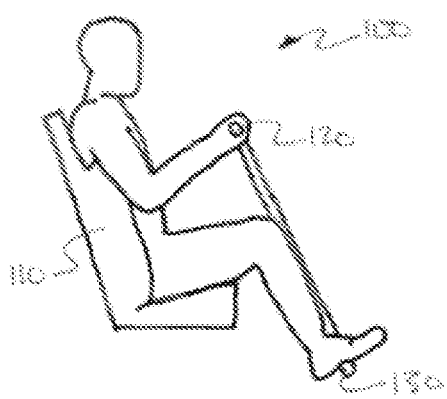
Figure 8B:
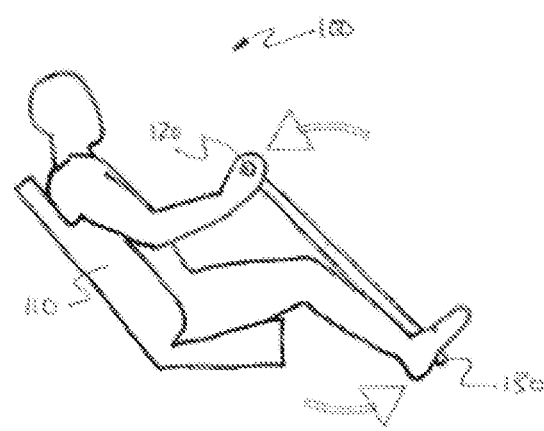
Figure 9A:
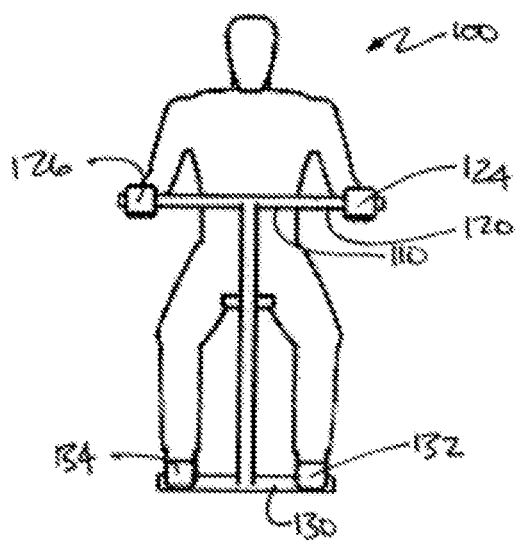

In a third variation, as shown in FIGS. 7-9, the engagement system 110 is very similar to the engagement system 110 of the first variation except that at least a portion of engagement system 110 is movable from a first position to a second position. The movable portion of the engagement system 110 preferably includes two portions that are movable in opposite directions (either linearly or rotationally) from a "near position" to a "far position", such as the handbase 120 and the footbase 130 that move in linearly opposite directions (FIG. 7) or rotationally opposite directions (FIG. 8), or the left handgrip 124 and the right handgrip 126 of the handbase 120 and/or the left footrest 132 and the right footrest 134 of the footbase 130 (FIG. 9). The movable portions of the engagement system 110 may be moved by the user, by an actuator, or by any other suitable device.

In a fourth variation, as shown in FIG. 10, the engagement system 110 is very similar to the engagement system 110 of the second embodiment except that the engagement system 110 also includes a handbase 120, such as a steering wheel.

2. The Sensor System of the Preferred Embodiments

The sensor system of the preferred embodiments functions to sense an intuitive input from the user and to send a sensor output to the processor 150. In a first variation, as shown in FIGS. 1-3, the sensor system senses the weight distribution of the user. More particularly, the sensor system senses a shift in the weight distribution of the user. The sensor system of this variation may sense a shift in the weight distribution of the user at the handbase 120 and the footbase 130, at the seat 140 and the footbase 130, at the left handgrip 124 and the right handgrip 126, at the left footrest 132 and the right footrest 134, or at any other suitable combination within the engagement system 110. Preferably, the sensor system includes an upper load cell integrated into the handbase 120, a lower load cell integrated into the footbase 130, and a middle load cell integrated into the seat 140. Alternatively, the sensor system may include any other suitable device to sense the weight distribution of the user.

In a second variation, as shown in FIGS. 4-6, the sensor system senses forces imparted by the torso of the user. More particularly, the sensor system senses a shift (either in force or in movement) of the torso of the user. The sensor system of this variation may sense a shift of the torso of the user at the left side bolster 146, at the right side bolster 148, at the seat back 142, at the seat bottom 144. Preferably, the sensor system includes force transducers integrated into the left side bolster 146 (sensor 152), into the right side bolster 148 (sensor 154), into the seat back 142, and into the seat bottom 144 (sensor 158). Alternatively, the sensor system may include any other suitable device to sense a shift (either in force or in movement) of the torso of the user.

Figure 9B:
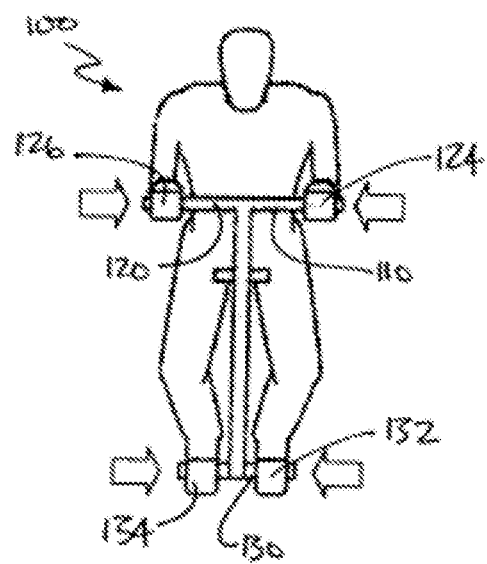

In a third variation, as shown in FIGS. 7-9, the sensor system senses forces imparted by the appendages of the user. More particularly, the sensor system senses a shift (either in force or in movement) of the appendages of the user. The sensor system of this variation may sense a shift of the appendages of the user at the left handgrip 124 and the right handgrip 126 of the handbase 120, at the left footrest 132 and the right footrest 134 of the footbase 130, or at the handbase 120 and the footbase 130. Preferably, the sensor system includes load cells 160, 162, 164 (of FIG. 9B) or force transducers, but may alternatively include any suitable device to sense a shift (either in force or in movement) of the appendages of the user. If the engagement system 110 includes an actuator, the actuator is preferably connected to the sensor system and arranged to move at least a portion of the engagement system 110 from a first position to a second position based on the forces sensed by the sensor system. Thus, the sensor system of this variation may be based on a shift of the forces (and may subsequently command the actuator to move at least a portion of the engagement system 110 between the first position to the second position), or the sensor system may be based on a shift of the position of the engagement system 110 by the user between the first position to the second position.

In a fourth variation, as shown in FIG. 10, the sensor system senses forces imparted by the appendages or the torso of the user. More particularly, the sensor system senses a shift (either in force or in movement) of the appendages or the torso of the user. The sensor system of this variation preferably senses a shift of the appendages at the steering wheel, or senses a shift of the torso at the seat back 142 or at the seat bottom 144. Preferably, the sensor system includes load cells or force transducers, but may alternatively include any suitable device to sense a shift (either in force or in movement) of the appendages or the torso of the user.

3. The Processor of the Preferred Embodiments

Figure 10A:
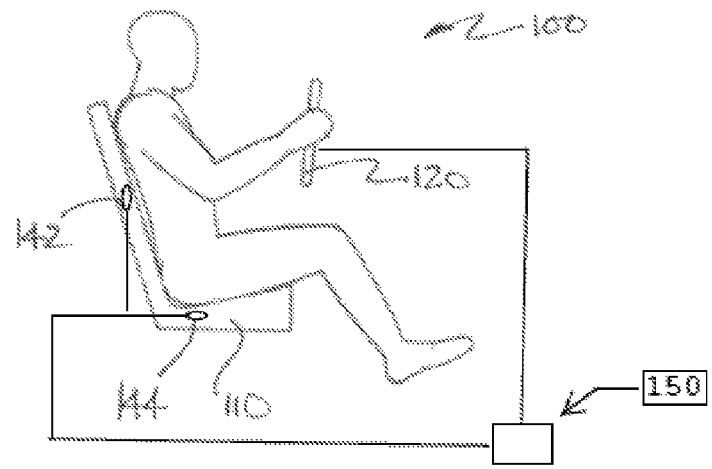
FIG. 10 includes side views of the fourth preferred embodiment.

The processor 150 (as shown in FIG. 10A) of the preferred embodiments functions to receive the sensor output from the sensor system, interpret a vehicle command based on the sensor output, and communicate a vehicle command to the vehicle. The processor 150 preferably receives the sensor output via an electrical bus integrated within the vehicle, but may alternatively receive the sensor output via any suitable device or method, such as Bluetooth RF technology. The processor 150 may interpret the vehicle command only when there is significant information to confirm that the user indeed wishes to invoke a particular vehicle command. As an example, the processor 150 may only invoke a vehicle roll command when the user shifts his weight distribution at both the handbase 120 and the footbase 130, and may ignore sensor output when the user only shifts his weight at only one of the handbase 120 and footbase 130. The processor 150 preferably interprets the vehicle command based on the sensor output and other factors, such as vehicle speed, vehicle yaw rate, or any other suitable vehicle parameter. The processor 150 may also interpret the vehicle command based on user preference, whether inputted and stored on a memory device or derived from past experiences. The processor 150 may include a connection to a computer or a network to download new software or to upload user preferences. The processor 150 preferably includes a conventional processor 150, but may alternatively include any suitable device or method to interpret a vehicle command based on the sensor output.

4. The First Preferred Embodiment

In a first preferred embodiment of the invention, as shown in FIGS. 1-3, the interface 100 includes an engagement system 110 of the first variation, a sensor system of the first variation, and a processor 150 that interprets a vehicle command based on the weight distribution of the user. The vehicle is preferably a "ride on" vehicle, such as a two-wheeled bicycle or motorcycle, a four-wheeled all-terrain vehicle ("ATV"), a jet ski, or a snowmobile. The vehicle command is preferably an attitude command (such as a vehicle pitch or a vehicle roll) or a handling command (such as a suspension command or a height command).

The processor 150 may be arranged to interpret a vehicle pitch command based on a shift of the weight distribution of the user at the handbase 120, at the footbase 130, and at the seat 140. As an example, if the user shifts his (or her) weight distribution from the seat 140 or footbase 130 (FIG. 1A) to the handbase 120 (FIG. 1B), the processor 150 may interpret the user command as a "pitch forward" command. Similarly, if the user shifts his weight distribution from the handbase 120 (FIG. 1A) to the footbase 130 and/or seat 140 (FIG. 1C), the processor 150 may interpret the user command as a "pitch rearward" command. These commands are fairly intuitive for the user since the user will want to dive down upon the approach of a downward slope, and pull up upon the approach of an upward slope of the terrain.

Figure 2C:
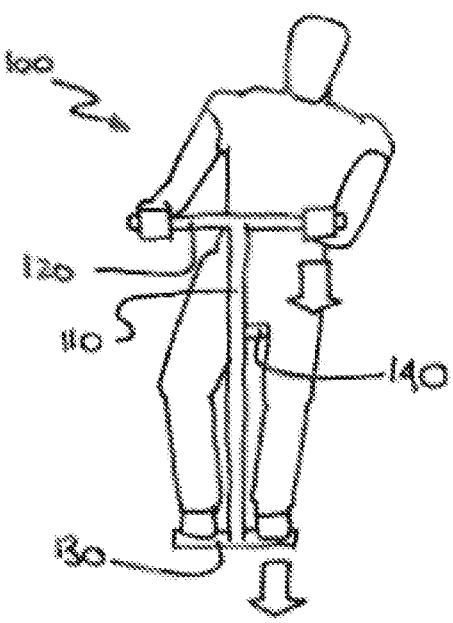
Figure 3A:
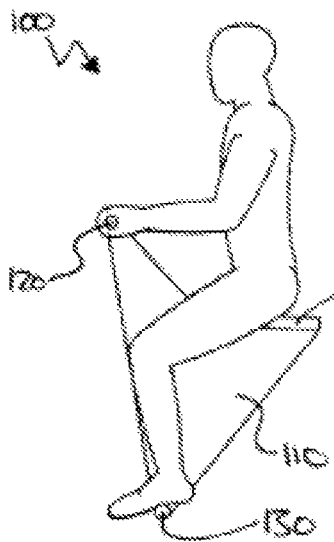
Figure 3B:
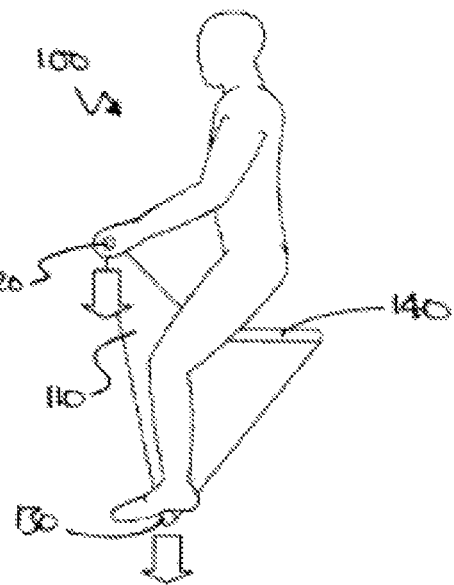
Figure 4A:
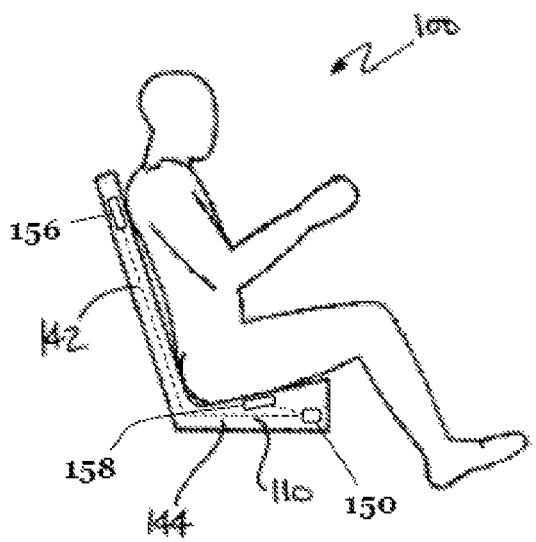
FIGS. 4-6 include side and front views of the second preferred embodiment.
Figure 4B:
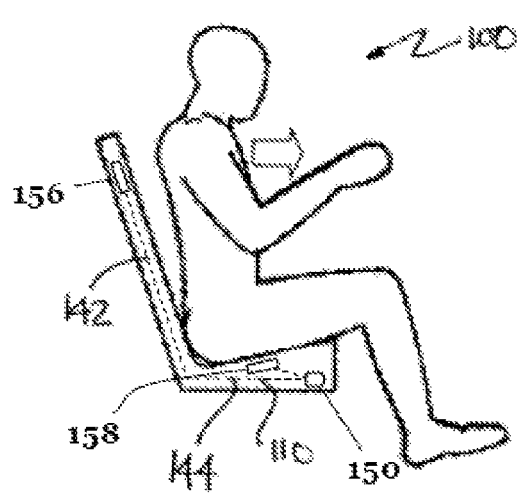
Figures 5A, 5B:
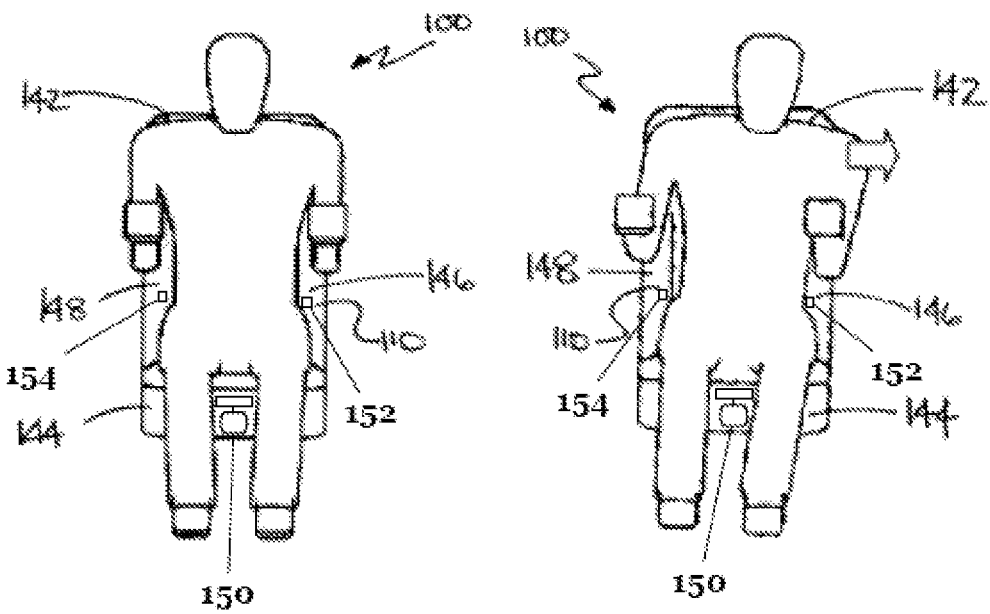
Figures 6A, 6B:
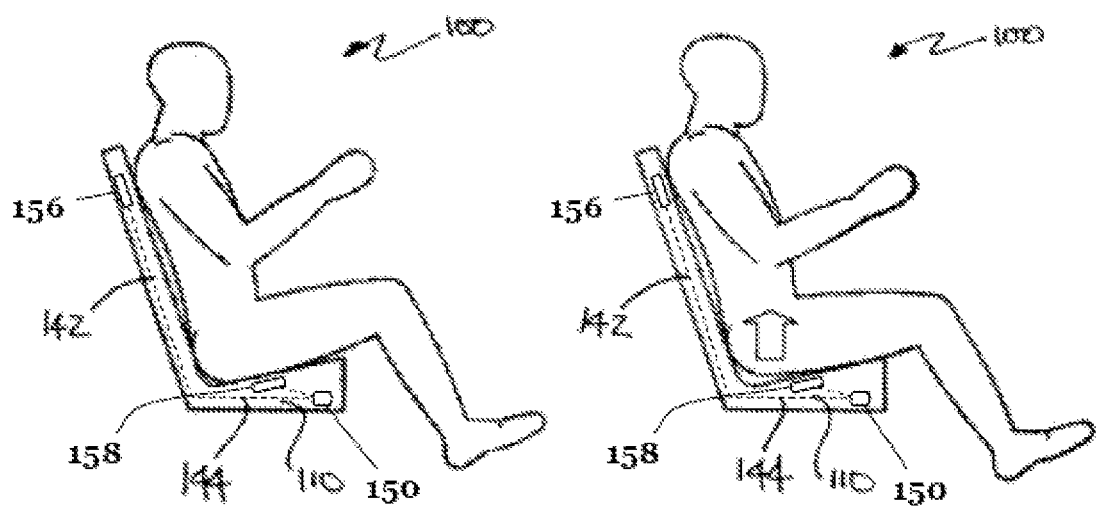

The processor 150 may be arranged to interpret a vehicle roll command based on a shift of the weight distribution of the user at the right handgrip 126 and the left handgrip 124 of the handbase 120, or at the left footrest 132 and the right footrest 134 of the footbase 130. As an example, if the user shifts his weight distribution from a center position (FIG. 2A) to the right side of the handbase 120 and/or the footbase 130 (FIG. 2B), the processor 150 may interpret the user command as a "roll right" command. Similarly, if the user shifts his weight distribution from a center position (FIG. 2A) to the left side of the handbase 120 and/or the footbase 130 (as shown in FIG. 2C), the processor 150 may interpret the user command as a "roll left" command. Like riding a bicycle or a motorcycle, these commands are fairly intuitive for the user since the user will want to lean right into a right turn and lean left into a left turn. This interface 100 allows the user to disconnect the roll command from the steering command, and to invoke a roll command either separate from, or significantly before, a steering command.

The processor 150 may be arranged to interpret a vehicle height command based on a shift of the weight distribution of the user at the handbase 120, at the footbase 130, and at the seat 140. As an example, if the user shifts his weight distribution from the seat 140 (FIG. 3A) to the handbase 120 and/or footbase 130 (FIG. 3B), the processor 150 may interpret the user command as a "height upward" command and/or a "suspension softer" command. Similarly, if the user shifts his weight distribution from the handbase 120 and/or footbase 130 (FIG. 3B) to the seat 140 (FIG. 3A), the processor 150 may interpret the user command as a "height downward" command and/or a "suspension tighter" command. Like riding a bicycle or a motorcycle, these commands are fairly intuitive for the user since the user will want to stand up and protect his spine during rough terrain (where it is beneficial to ride at a higher height and with a softer suspension), and will want to sit back and secure his grip of the controls during high speeds (where it is beneficial to ride at a lower height and with a tighter suspension).

The processor 150 may, of course, be arranged to interpret any particular combination or permutation of the above vehicle commands.

5. The Second Preferred Embodiment

In a second preferred embodiment of the invention, as shown in FIGS. 4-6, the interface 100 includes an engagement system 110 of the second variation, a sensor system of the second variation, and a processor 150 that interprets a vehicle command based on a shift of the torso of the user. The vehicle is preferably a "seated" vehicle, such as a three-wheeled cycle, a four-wheeled automobile or truck, a motorboat, or a small plane or helicopter. The vehicle command is preferably an attitude command (such as a vehicle pitch or a vehicle roll) or a handling command (such as a suspension command or a height command).

The processor 150 may be arranged to interpret a vehicle pitch command based on a shift of the torso of the user at the seat back 142 or at the seat bottom 144. As an example, if the user shifts his torso from a normal position (FIG. 4A) to a forward position (FIG. 4B), the processor 150 may interpret the user command as a "pitch forward" command. Similarly, if the user shifts his torso rearward, the processor 150 may interpret the user command as a "pitch rearward" command. These commands are fairly intuitive for the user since the user will want to dive down upon the approach of a downward slope, and pull up upon the approach of an upward slope of the terrain.

The processor 150 may be arranged to interpret a vehicle roll command based on a shift of the torso of the user at the seat bottom 144 or at the side bolsters 146 and 148. As an example, if the user shifts his torso from a center position (FIG. 5A) to a leaning left position (FIG. 5B), the processor 150 may interpret the user command as a "roll left" command. Similarly, if the user shifts his weight distribution from a center position (FIG. 5A) to a leaning right position (FIG. 5C), the processor 150 may interpret the user command as a "roll right" command. Like taking a hard turn in an automobile, these commands are fairly intuitive for the user since the user will want to lean right into a right turn, and lean left into a left turn. This interface 100 allows the user to disconnect the roll command from the steering command, and to invoke a roll command either separate from, or significantly before, a steering command.

The processor 150 may be arranged to interpret a vehicle height command based on a shift of the torso of the user at the seat back 142 or at the seat bottom 144. As an example, if the user shifts his torso from a normal position (FIG. 4A) to a forward position (FIG. 4B), the processor 150 may interpret the user command as a "height upward" command. Similarly, if the user shifts his torso rearward, the processor 150 may interpret the user command as a "height downward" command. Like riding in an automobile with a high or tall belt line, these commands are fairly intuitive for the user since the user will want to lean forward and increase his view of the surroundings during rough terrain (where it is beneficial to ride at a higher height), and will want to sit back and secure his grip of the controls during high speeds (where it is beneficial to ride at a lower height).

The processor 150 may be arranged to interpret a vehicle suspension command based on a shift of the torso of the user at the seat back 142 or at the seat bottom 144. As an example, if the user shifts his torso from a normal position (FIG. 6A) to a taut position with more weight and force on the thighs and upper back of the user (FIG. 6B), the processor 150 may interpret the user command as a "suspension softer" command. Like riding in an automobile with stiff (or no) shock absorbers, this command is fairly intuitive for the user since the user will want to lift up and protect his spine during rough terrain (where it is beneficial to ride with a softer suspension).

The processor 150 may, of course, be arranged to interpret any particular combination or permutation of the above vehicle commands.

6. The Third Preferred Embodiment

In a third preferred embodiment of the invention, as shown in FIGS. 7-9, the interface 100 includes an engagement system 110 of the third variation, a sensor system of the third variation, and a processor 150 that interprets a vehicle command based on a shift of the appendages of the user. The vehicle is preferably a "ride on" vehicle, such as a two-wheeled bicycle or motorcycle, a four-wheeled all-terrain vehicle ("ATV"), a jet ski, or a snowmobile. The vehicle command is preferably a configuration command (such as a wheelbase command, a track command, a hull shape command, or a wing shape command).

The processor 150 may be arranged to interpret a vehicle pitch command based on a shift in opposite directions of the appendages of the user at the handbase 120 and/or at the footbase 130. As an example, if the appendages of the user impart a force that tends to bias the handbase 120 and the footbase 130 in linearly opposite directions (FIG. 7) or rotationally opposite directions (FIG. 8), or that tends to bias the left handgrip 124 and the right handgrip 126 toward each other and/or the left footrest 132 and the right footrest 134 toward each other (FIG. 9), then the processor 150 may interpret the user command as a vehicle "speed mode" command. Similarly, if the appendages of the user impart a force that tends to bias the handbase 120 and the footbase 130 toward each other, tends to bias the left handgrip 124 and the right handgrip 126 in opposition directions, or tends to bias the left footrest 132 and the right footrest 134 in opposition directions, then the processor 150 may interpret the user command as a vehicle "maneuverability mode" command. Like riding a bicycle or a motorcycle, these vehicle commands are fairly intuitive for the user since the user will want to minimize his aerodynamic drag during high speed, and will want to maximize his stability during high maneuverability.

The vehicle, notified with this vehicle configuration command, may take appropriate actions, such as changing the wheelbase (the distance between the front wheels and the rear wheels) or the track (the distance between the left wheels and the right wheels) of a four wheeled automobile, changing the shape of the hull of a motorboat or the wing shape of an aircraft, or deploying stabilizer surfaces or fins on a land vehicle, a watercraft, or an aircraft.

The processor 150 may, of course, be arranged to interpret any particular combination or permutation of the above vehicle commands.

7. The Fourth Preferred Embodiment

Figure 10B:
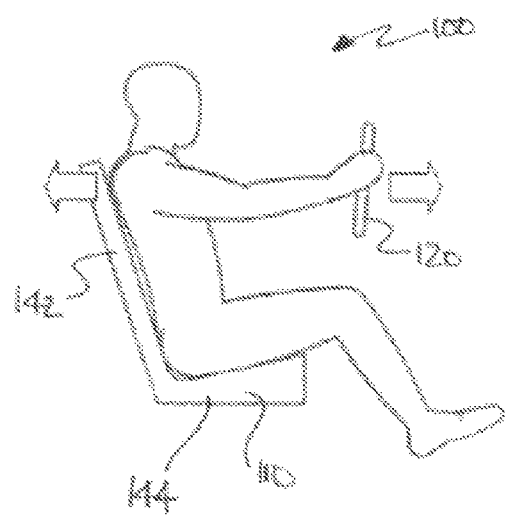
Figure 10C:
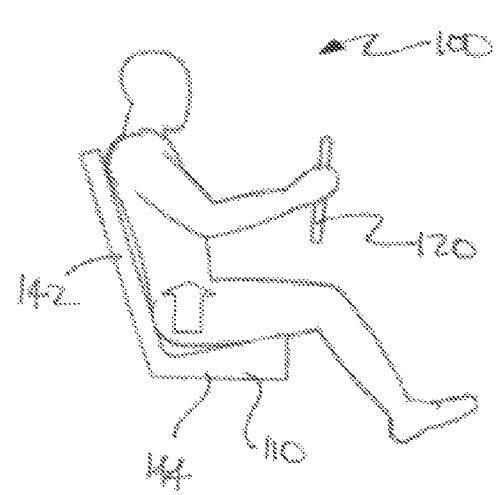

In a fourth preferred embodiment of the invention, as shown in FIGS. 10A, 10B, and 10C, the interface 100 includes an engagement system 110 of the fourth variation, a sensor system of the fourth variation, and a processor 150 that interprets a vehicle command based on a shift of the appendages or the torso of the user. The vehicle is preferably a "seated" vehicle, such as a three-wheeled cycle, or a four-wheeled automobile or truck. The vehicle command is preferably a mode command (such as a vehicle mode command).

The processor 150 may be arranged to interpret a vehicle "safety alert mode" command based on a shift of the appendages at the steering wheel or a shift of the torso of the user at the seat back 142 or at the seat bottom 144. As an example, if the user forcefully shifts his appendages forward into the steering wheel and/or shifts his torso rearward into the seat back 142 (FIG. 10B) or shifts his torso upward and out from the seat bottom 144 (FIG. 10C), the processor 150 may interpret the user command as a vehicle "safety alert mode" command. This command is fairly intuitive for the user since the user will want to brace himself in the event of a perceived potential collision of his vehicle. The vehicle, armed with this vehicle "safety alert mode" command, may take defensive actions, such as tightening the suspension, lowering the vehicle, inflating an external and/or internal airbag, or any other suitable action. The vehicle command may be communicated to the vehicle of the user, or may be broadcast to multiple vehicles. Since the user may be able to sense a potential collision better than an avoidance system of the vehicle, the vehicle "safety alert mode" command may be able to save lives.

The processor 150 may, of course, be arranged to interpret any particular combination or permutation of the above vehicle commands.

Although omitted for conciseness, the preferred embodiments include every combination and permutation of the various engagement systems, the sensor systems, the processors, the vehicles, and the vehicle commands. The preferred embodiments also include every combination of multiple engagement systems, the sensor systems, the processors, the vehicles, and the vehicle commands. As an example, the processor 150 may be arranged to interpret a "bunny hop" command, which may be a combination of a vehicle "pitch forward" command, a vehicle "pitch rearward" command, and a vehicle "height upward" command.

As a person skilled in the art of recognize from the previous detailed description and from the figures and claims, modifications and changes can be made to the preferred embodiments of the invention without departing from the scope of this invention defined in the following claims.

I claim:

1. An interface for a vehicle comprising:
a user support structure coupled to the vehicle and comprising a first support region and a second support region, the user support structure configured to support a portion of a body of a user across the first support region and the second support region;
a sensor system comprising a first sensor and a second sensor, the first sensor configured to detect a force applied to the first support region by the body of the user, the second sensor configured to detect a force applied to the second support region by the body of the user; and
a processor coupled to the sensor system and configured to detect a change in weight distribution of the body of the user across the first support region and the second support region, to interpret the shift in weight distribution as an indicator for an upcoming vehicle situation, and to generate a command to adjust a motion dynamic characteristic of the vehicle in response to the upcoming vehicle situation, the command is isolated from a vehicle direction of motion input and excluding a vehicle direction of motion adjustment component.

2. The interface of claim 1, wherein the user support system is coupled to the vehicle that is selected from the group consisting of a bicycle, a motorcycle, a tricycle, a car, a truck, a tracked vehicle, a jet ski, a motorboat, a snowmobile, and a four-wheeled all-terrain vehicle.

3. The interface of claim 1, wherein the support structure comprises a seat, wherein the first support region comprises a left seat bolster, and wherein the second support region comprises a right seat bolster wherein the processor generates the command that comprises a "roll left" command commensurate with a detected shift in weight distribution of the user toward the left seat bolster.

4. The interface of claim 3, wherein the left and right seat bolsters are operable between an engaged mode and a relaxed mode, the left and right seat bolsters configured to contact the torso of the user occupying the seat in the engaged mode, and the left and right seat bolsters retracted from the torso of the user in the relaxed mode.

5. The interface of claim 1, wherein the support structure comprises a footbase, wherein the first support region comprises a left foot rest wherein the second support region comprises a right foot rest, and wherein the processor generates the command that comprises a "roll left" command commensurate with a detected shift in weight distribution of the user toward the left foot rest.

6. The interface of claim 1, wherein the first support region comprises a handbase, wherein the second support region comprises a footbase, and, wherein the processor generates the command that comprises a "pitch rearward" command commensurate with a detected shift in weight distribution of the user from the handbase to the footbase.

7. The interface of claim 1, wherein the user support system is coupled to the vehicle that comprises a multi-wheeled road vehicle with a suspension system and a steering system, and wherein the processor generates the command to adjust a setting of the suspension system exclusive of a position of the steering system.

8. The interface of claim 7, wherein the support structure comprises a seat, wherein the first support region comprises a seat bottom, wherein the second support region comprises a seat back, and wherein the processor generates the command to lower the vehicle over the suspension system commensurate with a detected shift in weight distribution of the user from the seat back to the seat bottom.

9. The interface of claim 7, wherein the support structure comprises a seat, wherein the first support region comprises a seat bottom, wherein the second support region comprises a seat back, and wherein the processor generates the command to stiffen a portion of the suspension system commensurate with a shift in weight distribution of the user from the seat bottom to the seat back.

10. The interface of claim 1, wherein the support structure further comprises a third support region, wherein the sensor system further comprises a third sensor configured to detect a force applied to the third support region by the body of the user, and wherein the processor is configured to detect a change in weight distribution of the body of the user across the first support region, the second support region, and the third support region.

11. The interface of claim 10, wherein first support region comprises a footbase, the second support region comprises a seat, and the third support region comprises a handbase.

12. The interface of claim 11, wherein the support system is coupled to the vehicle that comprises a ride-on vehicle, wherein the second support region comprises a ride-on seat, and wherein the handbase is configured to receive a vehicle direction of motion input that comprises a steering input isolated from motion dynamic characteristics of the vehicle.

13. The interface of claim 1, wherein the processor is configured to ignore an isolated change in applied weight the first support region exclusive of the second support region and to generate the command in response to the chance in weight distribution of the body of the user across the first support region and the second support region.

14. The interface of claim 1, wherein the support structure comprise a handbase, the first support region comprises a left handgrip of the handbase, and the second support region comprises a right handgrip of the handbase, wherein the first sensor is arranged in the left handgrip and the second sensor is arranged in the right handgrip.

15. The interface of claim 1, wherein the support structure comprise a footbase, the first support region comprises a left footrest of the footbase, and the second support region comprises a right footrest of the footbase, wherein the first sensor is arranged in the left footrest and the second sensor is arranged in the right footrest.

16. The interface of claim 1, wherein the first sensor comprises a load cell.

17. The interface of claim 1, wherein the processor interfaces with the sensor system sensor to detect a shift in a position of the torso of the user.

18. The interface of claim 1, wherein the processor is configured to generate the command further according to at least one of the speed of the vehicle, a yaw rate of the vehicle, and a preference of the user.

19. The interface of claim 1, wherein the processor is further configured to predict an upcoming vehicle direction of motion input from the user, and wherein the processor is configured to generate the command further in response to the predicted upcoming vehicle direction of motion input.

20. The interface of claim 1, wherein the user support system is arranged within the vehicle that comprises an aircraft, and wherein the processor is configured to generate the command to adjust a shape of a wing of the aircraft.

21. The interface of claim 1, wherein the processor is configured to interpret a shift in weight distribution across the first support region and the second support region as a user reaction to a visible object ahead of the vehicle, and wherein the processor is configured to interpret the user reaction as the upcoming vehicle situation.

22. The interface of claim 1, wherein the processor is configured to generate the command prior to user entry of a vehicle direction of motion input that comprises a steering command.

* * * * *

UNITED STATES PATENT AND TRADEMARK OFFICE
CERTIFICATE OF CORRECTION

PATENT NO.        : 8,620,494 B2
APPLICATION NO.   : 13/341037
DATED             : December 31, 2013
INVENTOR(S)       : Joshua C. Coombs It is certified that error appears in the above-identified patent and that said Letters Patent is hereby corrected as shown below:

In the Claims

Column 8, line 31, Claim 1, "the command is isolated" should read --the command isolated--
Column 8, line 42, Claim 3, "seat bolster wherein the processor" should read --seat bolster, wherein the processor--
Column 8, line 54, Claim 5, "left foot rest wherein" should read --left foot rest, wherein--
Column 8, line 61, Claim 6, "and, wherein" should read --and wherein--
Column 9, line 36, Claim 13, "in applied weight the" should read --in applied weight on the--
Column 9, line 38, Claim 13, "chance" should read --change--

Signed and Sealed this
Fourteenth Day of October, 2014

Michelle K. Lee
*Deputy Director of the United States Patent and Trademark Office*